UNITED STATES PATENT OFFICE.

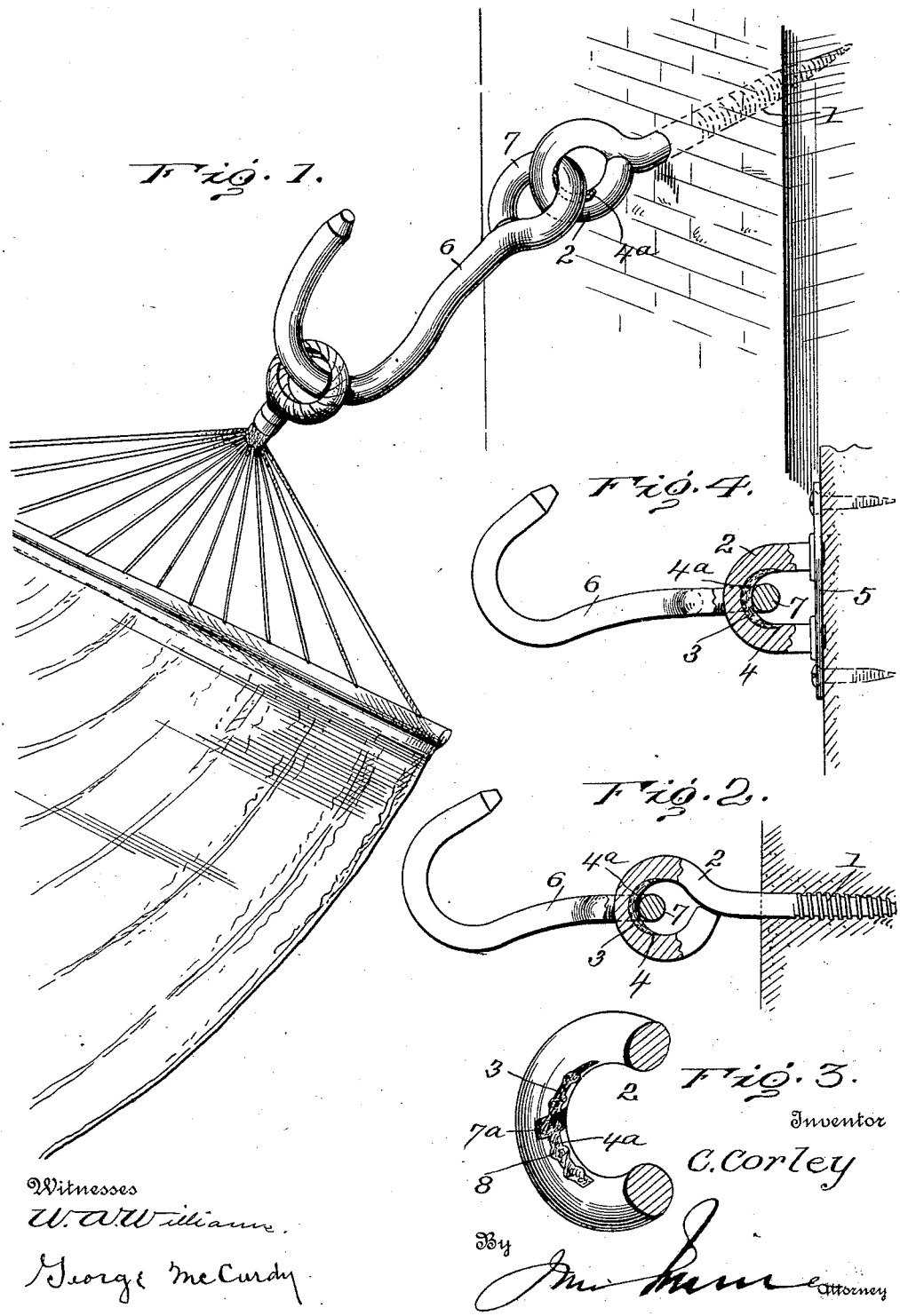

CLIFTON CORLEY, OF ATLANTA, GEORGIA.

HAMMOCK AND SWING SUPPORT.

1,048,946. Specification of Letters Patent. Patented Dec. 31, 1912.

Application filed May 4, 1911. Serial No. 625,049.

*To all whom it may concern:*

Be it known that I, CLIFTON CORLEY, a citizen of the United States, residing at Atlanta, in the county of Fulton and State of Georgia, have invented certain new and useful Improvements in Hammock and Swing Supports; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in supports for swings and hammocks.

The object of the invention is to provide special means for preventing the adjacent contacting surfaces of the interlocking members of the hooks of the support from "creaking" or making an annoying noise while swinging. To this end I provide one of the complementary members of the support with a longitudinal groove, the walls of which are formed with notches and pack the same with graphite, the other complementary member of the support having a smooth inner surface and frictionally engaging the lubricated surface.

The invention also relates to the specific details of construction and arrangement of parts which will be hereinafter described, and particularly pointed out in the claim.

In the drawings: Figure 1 is a perspective view showing the application of my invention. Fig. 2 is a side elevation, parts being broken away. Fig. 3 is an enlarged detail perspective view of the eye. Fig. 4 is a view similar to Fig. 2, but illustrating a different form of eye piece.

The numeral 1 indicates a screw formed at its outer end with an eye 2, on the inner surface of which is formed a longitudinal groove 3, the ends of said groove merging into the inner surface of the eye, as shown at 4. The groove is packed with graphite as indicated at $4^a$ the level of the graphite being flush with the inner surface of the eye. The groove 5, is provided with lateral transverse extensions 7, to increase the lubricating surface to facilitate the efficiency of the improvement. The walls of the longitudinal groove are provided with notches 8 to still further increase the lubricating surface and to afford greater gripping area for holding the graphite in position and thereby prevent said graphite from falling. If desired, the eye may be secured to a base plate 5, as shown in Fig. 4.

6 indicates a hook formed at one end with an eye 7, which is linked into the eye 2, the inner surface of the eye 7 engaging the inner surface of the eye 2, and also with the graphite $4^a$.

By providing a lubricant as herein described, the wearing surfaces between the eyes will readily slip past each other without the usual creaking or binding of the parts, as so frequently happen with supports of this nature now in use. The vertical disposition of the body of graphite will permit of the smooth inner surface of the eye of the hook to gradually lubricate the parts in such manner as will prevent an over supply of grease, making the invention neat and clean when in use. Furthermore by limiting the supply of lubricant the parts will wear clean and glossy and thereby prevent the formation of rust. By merging the groove into the inner surface of the eye of the screw and by providing the notches in the walls of said groove, the smooth surface of the eye of the hook will gradually pack the graphite into the groove and the notches when said eye is moved vertically. This is quite essential as the mass of graphite in time will, by gravity tend to sag.

Having thus described my invention, what I claim is:

In combination, two members, each having an eye, the said eyes being linked together and one of said eyes having a longitudinal groove, the walls of which are formed with notches and packed with a lubricant, one of said eyes being freely movable in the other over the surface of the lubricant.

In testimony whereof I have signed my name to this specification in the presence of two subscribing witnesses.

CLIFTON CORLEY.

Witnesses:
   W. N. WOODSON,
   JNO. IMIRIE.

Copies of this patent may be obtained for five cents each, by addressing the "Commissioner of Patents, Washington, D. C."